United States Patent
Zhang (10) Patent No.: US 12,351,074 B2
(45) Date of Patent: Jul. 8, 2025

(54) METHOD FOR OPERATING AN ELECTROMOTIVE DRIVE TRAIN

(71) Applicant: Vitesco Technologies GmbH, Regensburg (DE)

(72) Inventor: Hong Zhang, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 277 days.

(21) Appl. No.: 18/129,962

(22) Filed: Apr. 3, 2023

(65) Prior Publication Data
US 2023/0311665 A1    Oct. 5, 2023

(30) Foreign Application Priority Data

Apr. 4, 2022    (DE) .................. 10 2022 203 301.9

(51) Int. Cl.
*B60L 7/18*    (2006.01)
*B60H 1/14*    (2006.01)

(52) U.S. Cl.
CPC ................ B60L 7/18 (2013.01); *B60H 1/143* (2013.01); *B60L 2240/421* (2013.01); *B60L 2240/425* (2013.01); *B60L 2240/50* (2013.01)

(58) Field of Classification Search
CPC ........... B60L 15/2054; B60L 2240/421; B60L 2240/425; B60L 2240/50; B60L 2240/507; B60L 50/60; B60L 7/10; B60L 7/18; B60H 1/143; B60W 10/02; B60W 10/08; B60W 20/14; B60W 2510/244; B60W 2710/025; B60W 2710/081; B60W 2710/248; B60W 30/18127
See application file for complete search history.

(56) References Cited

U.S. PATENT DOCUMENTS

| 8,275,503 | B2 * | 9/2012 | Izumi | B60W 10/08 |
| | | | | 701/22 |
| 9,109,648 | B2 * | 8/2015 | Hiasa | B60W 20/00 |
| 12,194,984 | B2 * | 1/2025 | Chiba | B60W 10/10 |

(Continued)

FOREIGN PATENT DOCUMENTS

DE    102014211552 A1    12/2015

OTHER PUBLICATIONS

German Examination Report for German Application No. 10 2022 203 301.9, dated Sep. 13, 2022 with translation, 6 pages.

*Primary Examiner* — Tyler J Lee
(74) *Attorney, Agent, or Firm* — Buchanan Ingersoll & Rooney PC (57) ABSTRACT

A method for operating an electromotive drive train for a vehicle is disclose. The electromotive drive train has an electric machine for driving at least one wheel of the vehicle, a traction battery of the vehicle, which can be charged by the electric machine via recuperation, and a clutch device arranged between the electric machine and the at least one wheel. The method has the following steps: ascertaining a maximum permitted recuperation power of the electric machine to be fed into the traction battery by the electric machine during a braking procedure of the vehicle; and setting a slip state of the clutch device such that the recuperation power generated by the electric machine during the slip operation of the clutch device does not exceed the maximum permitted recuperation power.

9 Claims, 4 Drawing Sheets

(56) References Cited

U.S. PATENT DOCUMENTS

| | | | |
|---|---|---|---|
| 2007/0199745 A1* | 8/2007 | Hayashi | B60W 30/18118 180/65.28 |
| 2009/0082171 A1* | 3/2009 | Conlon | B60K 6/442 180/65.7 |
| 2012/0072065 A1* | 3/2012 | Minamikawa | B60K 6/547 903/903 |
| 2014/0257618 A1* | 9/2014 | Hiasa | B60W 10/115 903/946 |
| 2017/0182998 A1* | 6/2017 | Hatsuda | B60W 20/14 |
| 2022/0161663 A1* | 5/2022 | Ohashi | H02J 7/1423 |

* cited by examiner

METHOD FOR OPERATING AN ELECTROMOTIVE DRIVE TRAIN

CROSS REFERENCE TO RELATED APPLICATIONS

This application claims priority to German Patent Application No. 10 2022 203 301.9, filed Apr. 4, 2022, the contents of such application being incorporated by reference herein.

FIELD OF THE INVENTION

The present invention relates to a method for operating an electromotive drive train for a vehicle, in particular a method for operating an electromotive drive train which has a wheel-specific coupling device.

BACKGROUND OF THE INVENTION

Vehicles with electromotive drive trains typically have an electric machine (E machine) and a traction battery.

In such an electromotive drive train, the electric machine may be operated either in motor mode, in which the electric machine drives a wheel of the vehicle, or in generator mode. In the generator mode of the electric machine, it is possible to partially or fully recharge the traction battery of the vehicle via recuperation, as is well known to a person skilled in the art.

However, it has been shown that, in particular in the case of electromotive drive trains, during braking procedures in which the generator mode of the electric machine is used for recuperation of the traction battery, situations may arise in which recuperation of the traction battery is no longer possible or is only possible to a limited extent. This has an influence on the operation of the electric machine, which may possibly be disadvantageous.

SUMMARY OF THE INVENTION

An aspect of the invention is a method for operating an electromotive drive train for a vehicle, with which it is possible, both in normal operation and in extreme situations, to be able to implement optimal recuperation for the traction battery in each case during a braking procedure of the vehicle, without adversely affecting the braking power requested by the driver and without an additional braking device on the same wheel.

According to one aspect of the present invention, a method for operating an electromotive drive train for a vehicle is provided, wherein the electromotive drive train, in addition to an electric machine for driving at least one wheel of the vehicle and a traction battery of the vehicle, which can be charged by the electric machine via recuperation, moreover has a coupling device arranged between the electric machine and the at least one wheel. The method according to an aspect of the invention has the following steps: Ascertaining a maximum permitted recuperation power of the electric machine to be fed into the traction battery by the electric machine during a braking procedure of the vehicle and setting a slip state of the coupling device such that the recuperation power generated by the electric machine during the slip operation of the coupling device does not exceed the maximum permitted recuperation power. In other words, the slip state of the coupling device is set such that the recuperation power generated by the electric machine via the slip operation of the coupling device is less than the maximum permitted recuperation power or is equal to the maximum permitted recuperation power.

An aspect of the present invention is based at least partly on the recognition that, by providing a coupling device between the electric machine and the wheel of the vehicle, the slip operation of the coupling device may be set such that the recuperation power generated by the electric machine owing to the slip state of the coupling device may be adapted to the maximum permitted recuperation power in each case. The term slip state or slip operation of the coupling device here may be understood to mean a deviation between speeds of elements of the coupling device which are in frictional contact with each other. For example, the slip operation of the coupling device may refer to a variable which denotes a difference between the speed of the coupling device on the electric machine side and the speed of the coupling device on the wheel side. By setting the slip operation of the coupling device, it is therefore possible to set differences between the speed on the wheel side on the one hand and the speed on the electric machine side on the other such that, owing to the low speed on the electric machine side compared to the speed on the wheel side and owing to the mechanical elements of the coupling device which are in frictional contact with each other, a certain "braking torque" may be exerted on a shaft of the electric machine. This "braking torque" is determined from a wheel-braking-torque request and realized by the pressing force on the clutch. This "braking torque", and the speed on the electric machine side, which acts on the shaft of the electric machine via the coupling device operated in slip mode, determines the actual recuperation power which can be fed into the traction battery by the electric machine. This is because the slip operation of the coupling device results in the full torque of the wheel being transmitted to the shaft of the electric machine, but only a proportion of the braking power from the wheel, and more precisely a proportion which, in the first approximation, is reduced according to the speed difference. Consequently, owing to the slip operation of the coupling device, the electric machine ultimately provides a different, in particular lower, recuperation power compared to when a clutch device is fully engaged or is not even present in the first place.

The fundamental idea of an aspect of the present invention, therefore, is to adapt the actual recuperation power which can be provided by the electric machine to the maximum permitted recuperation power of the traction battery by setting a slip operation of the wheel-specific clutch device. The maximum permitted recuperation power here may be provided, for example, by a battery management system of the traction battery or by another control of the electromotive drive train or of the vehicle. However, it is ultimately irrelevant which component in the vehicle provides the maximum permitted recuperation power. The essential factor is that, after the maximum permitted recuperation power has been ascertained, the slip state of the clutch device is adapted according to the requirements of the traction battery. By means of the method according to an aspect of the invention, it is therefore possible to realize optimum recuperation for the traction battery both in normal operation of the electromotive drive train and in extreme situations of the electromotive drive train, such as a downhill journey with a fully or almost fully charged battery, for example.

It is particularly advantageous if, during the braking procedure, a pressing force of the clutch device is set such that a braking torque which can be transmitted or is transmitted to the wheel via the clutch device corresponds to a setpoint wheel braking torque requested by the driver of the vehicle. This advantageous configuration is based at least partly on the recognition that the frictional contact between the mechanical elements of the clutch device ultimately also represents a braking torque which can be adapted to a setpoint braking torque subject to the pressing force of the clutch device. Therefore, by setting the slip operation on the one hand and the pressing force on the other, it is ultimately possible to satisfy the requirements with regard to the recuperation power and setpoint braking torque.

In a further preferred configuration of the method according to the invention, a speed of the electric machine is moreover set depending on the slip state or slip operation of the clutch device. This preferred configuration is based at least partly on the knowledge that, due to the slip operation of the clutch device, the wheel, broadly speaking, drives the electric machine. However, since the speed of the electric machine is ultimately set and is not only down to the wheel driving the electric machine, it is possible, by setting the speed of the electric machine, to make use of a further parameter which affects the actual recuperation power which can be provided by the electric machine. It is therefore possible to optimally adapt the recuperation power which can be provided by the electric machine to the requirements of the traction battery via the mutually adapted setting of the slip state or slip operation of the clutch device on the one hand, possibly a pressing force on the other, and a speed of the electric machine.

It is particularly advantageous if the speed of the electric machine is set depending on a maximum permissible temperature of the electric machine. This particularly advantageous configuration is based at least partly on the knowledge that, when the electric machine is operated in generator mode, in which recuperation power would be generated but may not be fed into the traction battery, a temperature of the electric machine, in particular a temperature of an inverter of the electric machine, may rise in certain circumstances and possibly exceed a critical or maximum permissible temperature. However, since the speed of the electric machine is set depending on a maximum permissible temperature of the electric machine, it is possible to ensure a non-critical range for continuously error-free operation of the electric machine.

It is furthermore advantageous if the speed of the electric machine is set such that the speed of the electric machine is below or outside a field weakening range of the electric machine. This configuration is firstly based partly on the recognition that, owing to internal physical processes of the electric machine, the torque which can be provided by the electric machine decreases after a predetermined limit speed. However, if the torque which can be provided by the electric machine is ultimately intended to serve for braking the vehicle, for example, it is detrimental if the torque which is actually provided by the electric machine does not correspond to the maximum possible (braking) torque of the electric machine. However, since, according to the present configuration, the speed of the electric machine is set such that the speed of the electric machine is below or outside the field weakening range of the electric machine, the maximum possible (braking) torque is maintained, so to speak. In an ideal situation, it is thus even possible to brake the vehicle without an additional (central or wheel-specific) friction braking device. In other words, it is thus possible to brake the vehicle using the electric machine alone.

It is, in particular, advantageous if, before setting the speed of the electric machine to a speed below or outside the field weakening range, the clutch device is firstly switched to a fully disengaged state, the speed of the electric machine is then set to a speed below or outside the field weakening range, the slip state of the clutch device is then set and the electric machine is then controlled or regulated such that the speed of the electric machine is held at a speed below or outside the field weakening range. This particularly preferred configuration is based at least partly on the recognition that, by fully disengaging the clutch device, the speed of the electric machine is kept to a speed below or outside the field weakening range, so to speak, since the electric machine is not driven by the wheel in the disengaged state of the clutch device. Since the speed is always below or outside the field weakening range, the maximum (braking) torque which can be provided by the electric machine is maintained and is also available when the clutch device is operated in the set slip state again.

It is, in particular, advantageous if the clutch device is already switched to a fully disengaged state when the vehicle does not need to accelerate. In other words, the clutch device is always switched to a fully disengaged state if the vehicle is not required to accelerate. This may happen, for example, when the driver takes his foot off the gas pedal of the vehicle or if another corresponding request has been made. This particularly preferred configuration enables emergency braking with the maximum available (braking) torque to be possible at any time using the electric machine.

In a further preferred configuration, the method furthermore comprises the following step: Using the waste heat generated by the slip operation of the clutch device to heat a component or an area of the vehicle. This preferred configuration is based at least partly on the recognition that a component of the vehicle, for example the traction battery or a seat of the vehicle and/or an area of the vehicle, for example a vehicle cabin, may be heated by using the waste heat generated by the slip operation of the clutch device. To this end, a heat transfer medium, which is conveyed in a heat circulation system, may be used, for example. It is thus, in particular, possible to establish a heat management system in the vehicle, whereby the total energy requirement of the vehicle may be minimized.

BRIEF DESCRIPTION OF THE DRAWINGS

Further features and aspects of the present invention will become apparent to a person skilled in the art by practising the present teaching and taking into consideration the accompanying drawings. In the figures.

Elements of the same design or function are provided with the same reference signs.

DETAILED DESCRIPTION OF THE PREFERRED EMBODIMENTS

Figure 1:
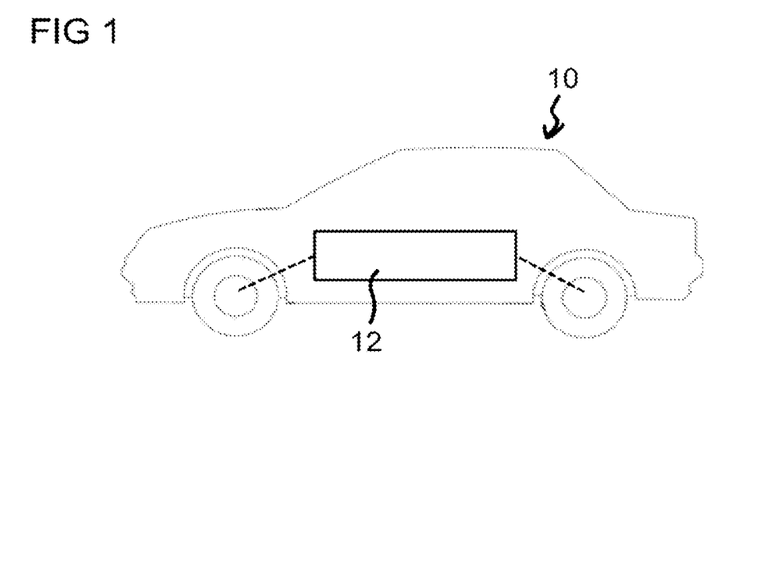
FIG. 1 shows a schematic diagram of a vehicle with an electromotive drive train.

Reference will firstly be made to FIG. 1, which shows a vehicle 10, which has an electromotive drive train 12. The vehicle 10 may be a battery-operated vehicle, for example. However, the vehicle may also be a hybrid vehicle, which also has an electromotive drive train in addition to an internal combustion engine.

Figure 2:
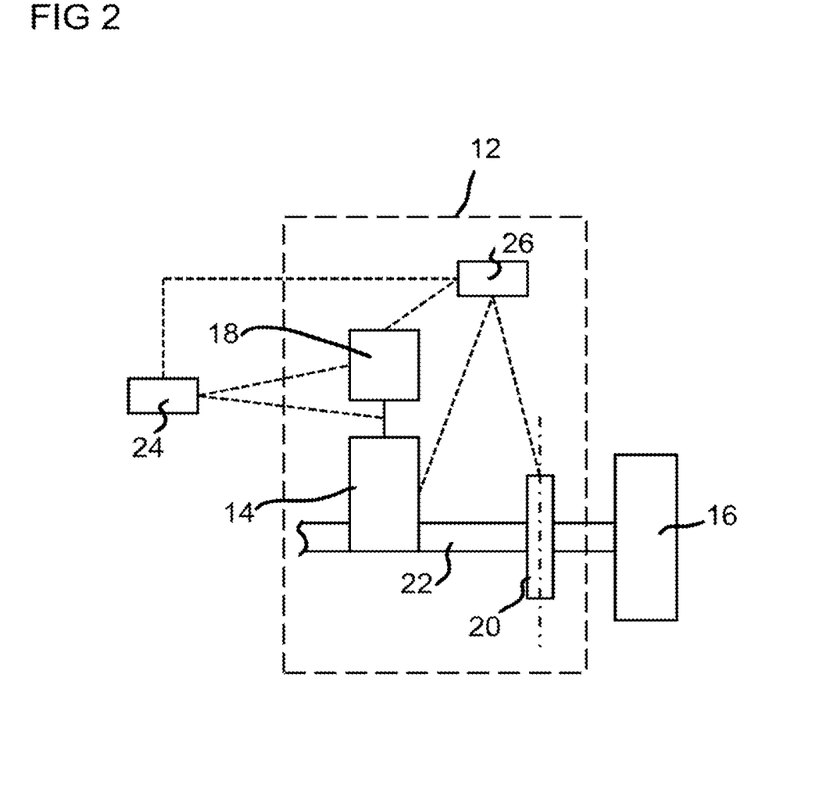
FIG. 2 shows a detail of an electromotive drive train with a wheel-specific coupling device.

Reference will now be made to FIG. 2, which shows a detail of the electromotive drive train 12 of FIG. 1.

The electromotive drive train 12 has, amongst other things, an electric machine 14 for driving a wheel 16 of the vehicle 10. The electric machine 14 may drive one or more wheels 16 of the vehicle 10. The electromotive drive train 12 furthermore has a traction battery 18 of the vehicle 10, which can be charged by the electric machine 14. The electromotive drive train 12 moreover has a clutch device 20 arranged between the electric machine 14 and a respective wheel 16. The clutch device 20 may therefore also be referred to as a wheel-specific clutch device 20. The clutch device 20 here may comprise mechanical elements which are in frictional contact with each other, wherein a first group of mechanical elements is associated with the wheel 16 and a second group of mechanical elements is associated with the electric machine 14. Subject to the slip state of the clutch device 20, there may be frictional contact between the mechanical elements associated with the wheel 16 and the mechanical elements associated with the electric machine 14. The slip state or slip operation of the coupling device 20 indicates a parameter which is representative of a difference between the speed on the side associated with the electric-machine 14 and the speed on the side associated with the wheel 16.

By setting the slip operation of the coupling device, it is also possible to set differences between the speed on the wheel side on the one hand and the speed on the side associated with the electric machine 14 on the other such that, owing to the different speeds and the mechanical elements of the coupling device 20 which are in frictional contact with each other, they may exert a torque on a shaft 22 of the electric machine 14. The clutch device 20 may be regulated or controlled, for example, such that the speed on the side of the clutch device 20 which is associated with the electric machine 14 is, for example, less than the speed on the side of the clutch device 20 which is associated with the wheel 16. A control device may then calculate the required slip operation or slip state of the clutch device 20 based on the different speeds. The control device may also set the slip state of the clutch device 20 such that a speed on the side associated with the electric machine 14 corresponds to a speed of the shaft 22 of the electric machine 14 which is needed to maintain a recuperation power to be generated by the electric machine 14. In other words, the recuperation power which can be generated by the electric machine 14 may be set via the slip state of the clutch device 20 and the resultant speed on the side associated with the electric machine 14.

It is furthermore possible to set a pressing force of the clutch device 20 such that a braking torque transmitted to the wheel 16 via the clutch device 20 corresponds to a predetermined setpoint braking torque. The pressing force of the clutch device 20 here denotes the strength with which the mechanical elements of the clutch device 20 which are in frictional contact with each other are pressed against each other.

The traction battery 18 described above may be charged by the electric machine 14 in the event that the electric machine 14 is operated in generator mode, as is well known to a person skilled in the art. Recuperation power provided by the electric machine 14 is used here to charge the traction battery 18. The components of the electric machine 14 which are required for this, for example an inverter, which converts AC voltage or alternating current into DC voltage or direct current are well known to a person skilled in the art and are therefore not described in more detail.

It may now occur that the traction battery 18 may only be charged to a certain extent via recuperation. The extent to which energy may be recuperated for the traction battery 18 is referred to as the maximum permitted recuperation power of the electric machine 14 within the context of this disclosure. The maximum permitted recuperation power of the electric machine 14 may be specified by a battery management system BMS 24, for example, and may vary subject to the state of the traction battery 18, the behavior of the vehicle 10 or other influences. It is also possible that a superordinate control device (not shown) specifies a maximum permitted recuperation power and shares this with the BMS 24, for example.

For signal transmission, the BMS 24 is connected to the traction battery 18 and to an electrical connection between the traction battery 18 and the electric machine 14. The BMS 24 may restrict or interrupt an electrical connection between the traction battery 18 and the electric machine 14. In particular, the BMS 24 may restrict or interrupt an electrical connection between the traction battery 18 and the electric machine 14 if the recuperation power generated by the electric machine 14 were to exceed the maximum permitted recuperation power. In such a case, the BMS 24 would restrict or interrupt the electrical connection between the traction battery 18 and the electric machine 14, which would result in the recuperation power, which is still generated by the electric machine 14, either having to be reduced by reducing the speed of the electric machine 14 or having to be otherwise consumed. It is, indeed, possible for this recuperation power, which may now not be fed into the traction battery 18, to be partly converted into heat, for example via a resistor. The idea of the present disclosure, however, consists in that the excess braking power of the wheel 16 which may not be fed into the traction battery 18 must, at any rate, instead be converted into heat via the frictional contact between the mechanical elements of the clutch device 20. This is ensured by the wheel brake, without an additional braking device. Moreover, this not only reduces the build-up of heat on the side associated with the electric machine 14, but also enables the waste heat generated by the slip operation of the clutch device 20 to be used to heat a component or an area of the vehicle 10, for example. By way of example, this may take place in that a heat transfer medium (not shown), which is conveyed in a heat circulation system (not shown), may be transported by the waste heat generated by the clutch device 20 to the component to be heated or to the area of the vehicle 10 which is to be heated.

In FIG. 2, a control device 26 is furthermore shown, which, for signal transmission, is at least in contact with the traction battery 18, the BMS 24, the electric machine 14 and the clutch device 20. The control device 26 may, for example, ascertain the maximum permissible recuperation power subject to the particular application, for example via the signal-carrying connection to the BMS 24.

The control device 26 may furthermore regulate or control the electric machine 14, in particular regulate or control the speed thereof. In this regard, the control device 26 may specify a speed of the electric machine 14, for example, so that the electric machine 14 may not exceed this specified or predetermined rotational speed, for example, or must keep to a predetermined speed.

The control device 26 may furthermore regulate or control the clutch device 20, in particular the slip operation or slip state of the clutch device 20 as well as the pressing force of the mechanical elements of the clutch device 20 which is needed for the frictional contact. The control device 26 may therefore directly influence the speed at the shaft 22 on the side associated with the electric machine 14 as well as the force flow transmitted between the wheel 16 and the electric machine 14.

Ultimately, the braking torque which can be transmitted to the wheel 16 by the electric machine 14 on the one hand and the recuperation power which can be generated by the electric machine 14 on the other may be influenced by activating the clutch device 20 and the electric machine 14 accordingly by means of the control device 26.

Figure 3:
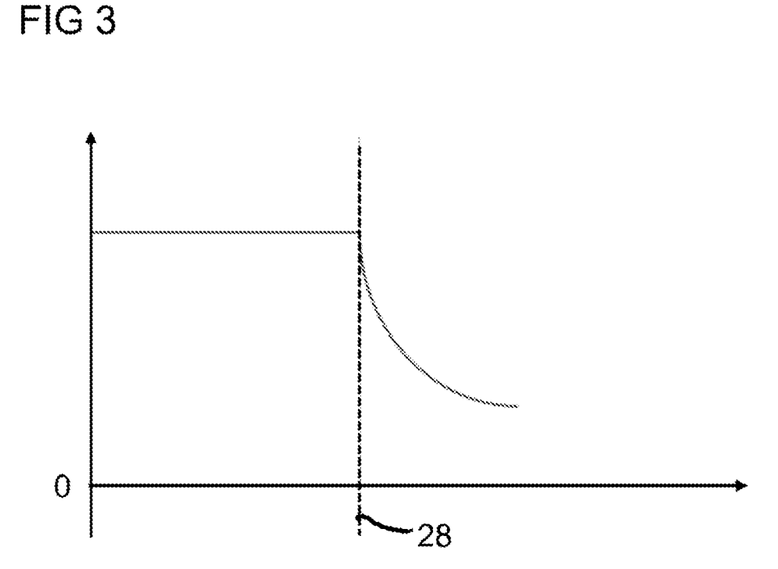
FIG. 3 shows a graph for an electric machine of the electromotive drive train.

Reference is now made to FIG. 3, which shows a graph for the electric machine 14.

The speed is plotted on the x-axis and the torque which can be provided by the electric machine 14 is plotted against the speed of the electric machine 14 on the y-axis.

As can be seen, the maximum torque can be provided by the electric machine 14 up to a limit speed 28. As soon as the speed of the electric machine 14 exceeds the limit speed 28, the torque which can be provided by the electric machine 14 decreases. The reason for the decrease in the torque which can be provided is an intrinsic effect of the electric machine 14, which, also known as "field weakening", is known to a person skilled in the art and is therefore not described in more detail.

Within the context of this disclosure, operating the electric machine 14 at a speed which is greater than the limit speed 28 is referred to as operating the electric machine 14 in the field weakening range. In contrast, operating the electric machine 14 at a speed which is less than or equal to the limit speed 28 is referred to as operating the electric machine 14 outside or below the field weakening range. Following this concept, if the electric machine 14 is therefore operated in a range outside or below the field weakening range, the electric machine 14 may then provide the maximum torque since the electric machine 14 is not subject to the above-mentioned intrinsic field weakening effect, which would lead to a drop in the torque which can be provided by the electric machine 14.

Figure 4:
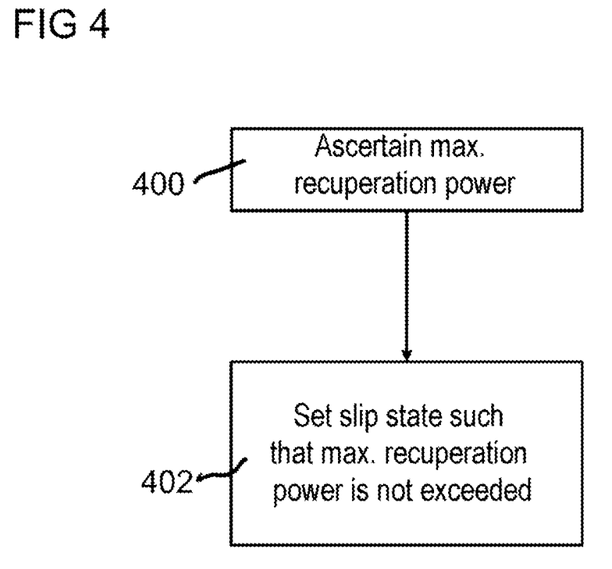
FIG. 4 shows a flow chart for an embodiment of a method according to the invention for operating an electromotive drive train.

Reference is now made to FIG. 4, in which a flow chart for carrying out a method for operating an electromotive drive train, for example the drive train 12 of the vehicle 10, is shown.

In step 400, the method ascertains the maximum permitted recuperation power of the electric machine 14 which is to be fed into the traction battery 16 by the electric machine 14 during a braking procedure of the vehicle 10. As mentioned above, this may be realized via a signal-carrying line between the control device 26 and the BMS 24.

In step 402, the slip state of the clutch device 20 is now set such that the recuperation power generated by the electric machine 14 during the slip operation of the clutch device 20 does not exceed the maximum permitted recuperation power. To this end, the control device 26 may refer to tabular values, which indicate a functional connection between the slip state which can be set at the clutch device 20 and the resultant speed on the side associated with the electric machine 14 or the resultant recuperation power. In other words, on the basis of tabular values, the control device 26 may determine which slip state of the clutch device 20 should be set for which speed on the side associated with the electric machine 14 in order to obtain a recuperation power which can be provided by the electric machine 14. The control device 26 will set the slip state of the clutch device 20 such that the recuperation power which can be provided by the electric machine 14 is less than or equal to the maximum permissible or maximum permitted recuperation power.

Figure 5:
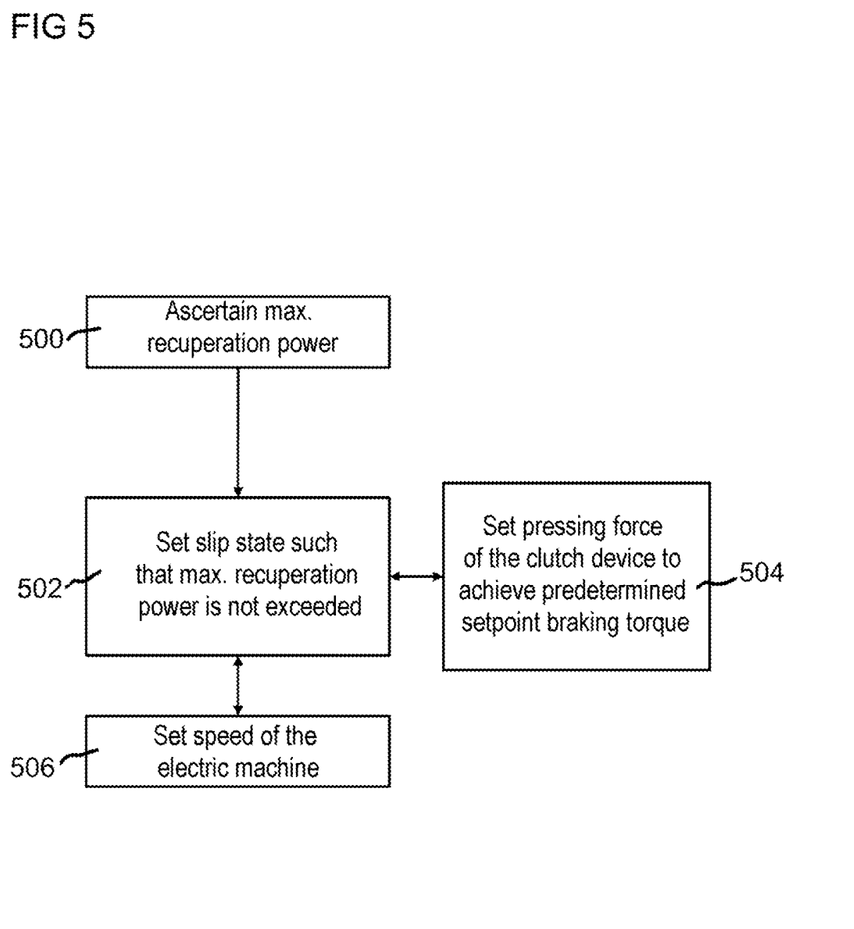
FIG. 5 shows a flow chart for a further embodiment of the method according to the invention.

Reference is now made to FIG. 5, which shows a flow chart of a further embodiment of the method for operating the electromotive drive train 12.

In the method according to FIG. 5, in step 500, the maximum permitted recuperation power of the electric machine 14 which is to be fed into the traction battery 18 by the electric machine 14 during a braking procedure is again ascertained.

In step 502, the slip state of the clutch device 20 is set such that the recuperation power generated by the electric machine 14 does not exceed the maximum permitted recuperation power. However, the setting of the slip state, which is carried out in step 502, moreover takes place depending on the setting of a pressing force of the clutch device 20 in step 504 to achieve a predetermined setpoint wheel braking torque, in particular as requested by the driver of the vehicle 10.

The steps 502 and 504 may be carried out in succession or in parallel. The double-headed arrow shown between the steps 502 and 504 is intended to indicate that the setting of the slip state on the one hand and the pressing force on the other in steps 502 and 504 may have a mutual reciprocal effect. Since the control device 26 may also control or regulate the pressing force of the clutch device 20, in addition to the slip state, it is possible, using tabular values which can be accessed by the control device 26, for example, to set the pressing force and the slip state such that the maximum permitted recuperation power is not exceeded on the one hand and the requested, predetermined setpoint braking torque is achieved on the other.

In addition to the above-mentioned steps 502 and 504, in which the slip state is set on the one hand and the pressing force of the clutch device 20 on the other, in the method according to FIG. 5, the step 506 is moreover present, in which a speed of the electric machine 14 is set. The speed of the electric machine 14 is also set via the control device 26. The speed of the electric machine 14, the slip state of the clutch device 20 and the pressing force of the clutch device 20 may possibly influence each other, so the control device 26 may again refer to tabular values, for example, in which there is a functional connection between the variable slip state, pressing force, speed of the electric machine 14 and the resultant recuperation power on the one hand and the setpoint braking torque on the other.

Figure 6:
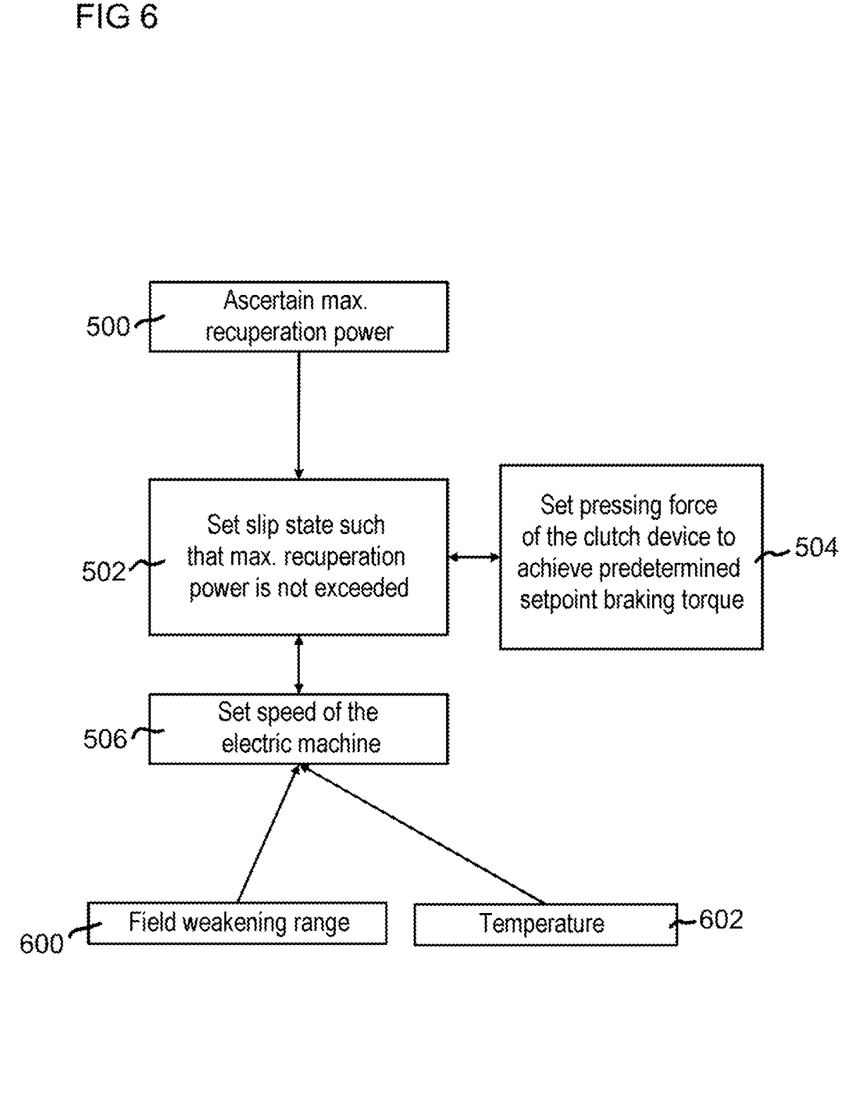
FIG. 6 shows flow chart for a further embodiment of the method according to the invention.

Reference is now made to FIG. 6, which shows a flow chart of a further embodiment of the method for operating the electromotive drive train 12.

The method according to FIG. 6 comprises the steps 500 to 506 according to the exemplary embodiment of FIG. 5. In the method according to FIG. 6, however, the additional steps 600 and 602 are present, according to which the speed of the electric machine 14 is set depending on the field weakening range of the electric machine 14 and/or the temperature of the electric machine 14. In this regard, the control device 26 can access a graph according to FIG. 3, for example, which is representative of the electric machine 14, for example again in the form of tabular values. According to these tabular values, the control device 26 is now able to set the speed of the electric machine 14 below the limit speed 28 shown by way of example in FIG. 3. This prevents the electric machine 14 from being operated in the field weakening range during the braking procedure.

Alternatively or additionally, the speed of the electric machine 14 is also set depending on the temperature at the electric machine 14, wherein the temperature may also be a temperature of an inverter of the electric machine 14, for example.

In particular, before setting the speed of the electric machine 14 to a speed below or outside the field weakening range, the clutch device 20 is fully disengaged, then the speed of the electric machine 14 is set, the slip state of the clutch device 20 is subsequently set and the speed of the electric machine 14 is subsequently held at a speed below or outside the field weakening range. The control device 26 may then always arrange for the fully disengaged state of the clutch device if the vehicle 10 is not required to accelerate.

The method may finally also use the waste heat generated by the slip operation of the clutch device 20 to heat a component or an area of the vehicle 10. The control device 26 here may have access to a heat requirement ascertained for a particular component or a particular area of the vehicle 10, for example, and regulate or control the conveyance of a heat transfer medium in a heat circulation system such that some or all of the waste heat of the clutch device 20 may be used to heat the component or the area of the vehicle 10.

The invention claimed is:

1. A method for operating an electromotive drive train for a vehicle, wherein the electromotive drive train has an electric machine for driving at least one wheel of the vehicle, a traction battery of the vehicle, which can be charged by the electric machine via recuperation, and a clutch device arranged between the electric machine and the at least one wheel, the method comprising:
    ascertaining a maximum permitted recuperation power of the electric machine which is to be fed into the traction battery by the electric machine during a braking procedure of the vehicle;
    setting a slip state of the clutch device such that the recuperation power generated by the electric machine during the slip operation of the clutch device does not exceed the maximum permitted recuperation power; and
    setting a speed of the electric machine depending on a maximum permissible temperature of the electric machine.

2. The method as claimed in claim 1, furthermore comprising:
    setting a pressing force of the clutch device such that a braking torque transmitted to the wheel via the clutch device corresponds to a predetermined setpoint braking torque.

3. The method as claimed in claim 1, further comprising:
    setting a speed of the electric machine depending on the slip state of the clutch device.

4. A method for operating an electromotive drive train for a vehicle, wherein the electromotive drive train has an electric machine for driving at least one wheel of the vehicle, a traction battery of the vehicle, which can be charged by the electric machine via recuperation, and a clutch device arranged between the electric machine and the at least one wheel, the method comprising:
    ascertaining a maximum permitted recuperation power of the electric machine which is to be fed into the traction battery by the electric machine during a braking procedure of the vehicle; and
    setting a slip state of the clutch device such that the recuperation power generated by the electric machine during the slip operation of the clutch device does not exceed the maximum permitted recuperation power,
    wherein a speed of the electric machine is set such that the speed of the electric machine is below or outside a field weakening range of the electric machine.

5. The method as claimed in claim 4, furthermore comprising:
    setting a speed of the electric machine depending on a maximum permissible temperature of the electric machine.

6. The method as claimed in claim 4, wherein, before setting the speed of the electric machine to a speed below or outside the field weakening range,
    the clutch device is firstly switched to a fully disengaged state,
    the speed of the electric machine is then set to a speed below or outside the field weakening range,
    the slip state of the clutch device is then set, and
    the electric machine is then controlled such that the speed of the electric machine is held at a speed below or outside the field weakening range.

7. The method as claimed in claim 6, wherein the clutch device is always switched to a fully disengaged state when the vehicle does not need to accelerate.

8. A method for operating an electromotive drive train for a vehicle, wherein the electromotive drive train has an electric machine for driving at least one wheel of the vehicle, a traction battery of the vehicle, which can be charged by the electric machine via recuperation, and a clutch device arranged between the electric machine and the at least one wheel, the method comprising:
    ascertaining a maximum permitted recuperation power of the electric machine which is to be fed into the traction battery by the electric machine during a braking procedure of the vehicle;
    setting a slip state of the clutch device such that the recuperation power generated by the electric machine during the slip operation of the clutch device does not exceed the maximum permitted recuperation power; and
    using waste heat generated by the slip operation of the clutch device to heat a component or an area of the vehicle, selected from at least one member of the group consisting of the traction battery, a seat of the vehicle, a cabin of the vehicle, and a heat circulation system of the vehicle.

9. The method as claimed in claim 1, wherein the speed of the electric machine is set such that the speed of the electric machine is below or outside a field weakening range of the electric machine.

* * * * *